(12) United States Patent
Wissing

(10) Patent No.: US 6,646,210 B1
(45) Date of Patent: Nov. 11, 2003

(54) DEVICE AND METHOD FOR DETECTING THE WEIGHT OF THE USEFUL LOAD OF A COMMERCIAL VEHICLE BY MEANS OF A VERTICAL SENSOR

(75) Inventor: Ludger Wissing, Gescher (DE)

(73) Assignee: Pfreundt GmbH & Co. KG, Sudlohn (DE)

( * ) Notice: Subject to any disclaimer, the term of this patent is extended or adjusted under 35 U.S.C. 154(b) by 0 days.

(21) Appl. No.: 09/720,023
(22) PCT Filed: Jun. 18, 1999
(86) PCT No.: PCT/DE99/01800
§ 371 (c)(1), (2), (4) Date: Mar. 15, 2001
(87) PCT Pub. No.: WO99/67607
PCT Pub. Date: Dec. 29, 1999

(30) Foreign Application Priority Data
Jun. 19, 1998 (DE) .................................... 198 27 268

(51) Int. Cl.⁷ ............................................. G01G 19/08
(52) U.S. Cl. ................ 177/136; 177/137; 177/139; 702/174
(58) Field of Search ................ 177/136, 137, 177/138, 139; 702/173, 174, 175

(56) References Cited

U.S. PATENT DOCUMENTS 4,630,227 A * 12/1986 Hagenbuch ............ 177/136
5,650,930 A * 7/1997 Hagenbunch ............ 702/174
5,877,455 A 3/1999 Kyrtsos .................. 177/136
5,973,273 A * 10/1999 Tai et al. ................ 177/136

FOREIGN PATENT DOCUMENTS

| DE | 3611189 | 10/1987 |
|---|---|---|
| DE | 19508239 | 9/1996 |
| DE | 29810965 | 12/1998 |
| EP | 0410709 | 1/1991 |
| EP | 0537857 | 4/1993 |
| EP | 0932032 | 7/1999 |

* cited by examiner

*Primary Examiner*—Randy Gibson
(74) *Attorney, Agent, or Firm*—Merchant & Gould P.C.

(57) ABSTRACT

The invention relates to a device for detecting the weight of the useful load of a commercial vehicle, comprising sensors which detect the amount of vehicle load produced by said useful load, in addition to a data memory that records information detected by said sensors. The sensors are designed to detect vertical acceleration. The invention also relates to a method for determining the useful load of a commercial vehicle, whereby the signals from the sensors that register the weight of the load of the commercial vehicle or the weight of a component receiving said useful load are supplied to the data memory either immediately or in a prepared form in order to detect vertical acceleration.

8 Claims, 1 Drawing Sheet

Figure 1:
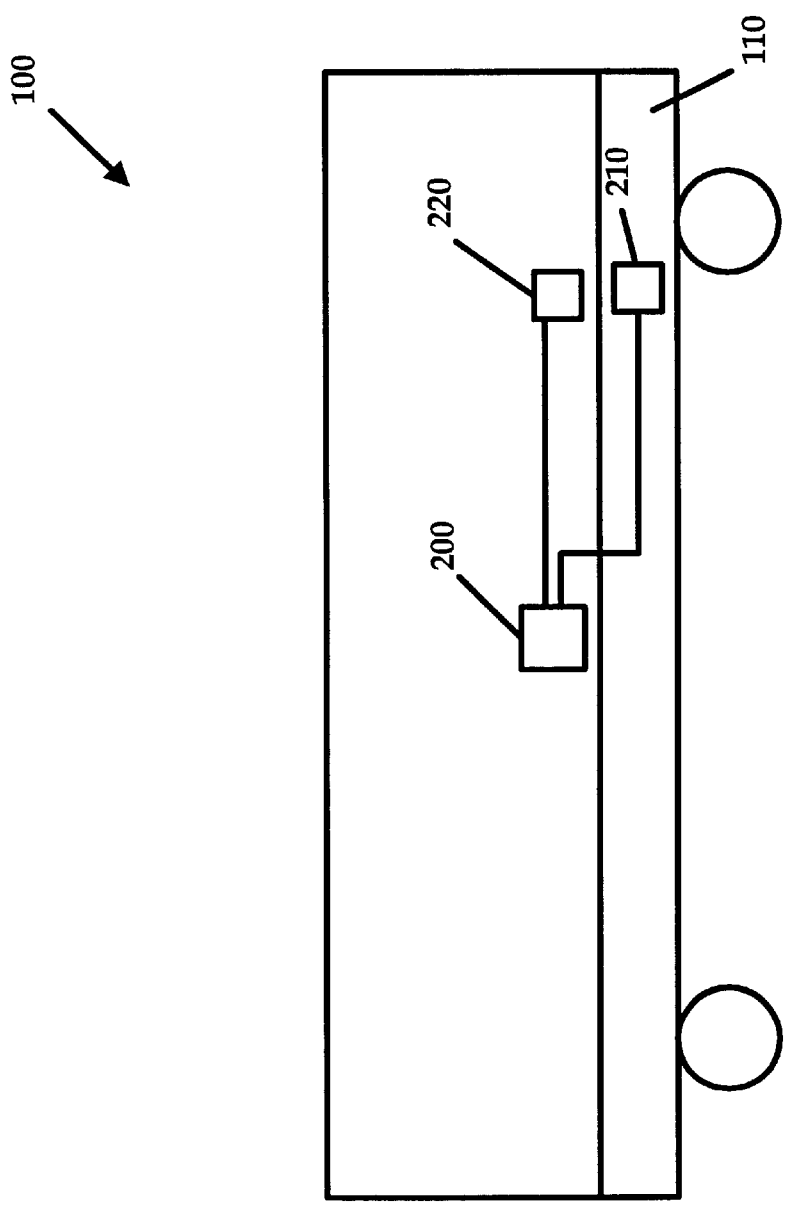

DEVICE AND METHOD FOR DETECTING THE WEIGHT OF THE USEFUL LOAD OF A COMMERCIAL VEHICLE BY MEANS OF A VERTICAL SENSOR

The invention relates to a device according to the precharacterizing clause of claim 1 and to a method according to the precharacterizing clause of claim 7.

A device of the genre and a method of the genre are known from U.S. Pat. No. 5,877,455, whereby the sensors in each case must be on all the axles of the vehicle and, if applicable, of a trailer. From DE 36 11 189 A1 and from DE 195 08 239 A1 are known devices and methods not of the genre.

As with many other differently designed devices and methods known in practice, the mentioned documents deal with weighing equipment by aid of which the load capacity of a utility vehicle is supposed to be precisely ascertained and thus determined.

The component assuming the payload, as known from DE 36 11 189 A1, can, for example be the flatbed body of a truck or a container or, as known from DE 195 08 239 A1, the trailer of a semitrailer truck or, as often in practice, the scoop of a front-end loader, the dump body of a dump truck or of a dumper.

The striven-for most precise possible weight determination, according to DE 36 11 189 A1, serves to maintain the legally prescribed maximum weight of the payload and/or the maximum weight of the vehicle and promotes, through application of several sensors arranged in a distributed manner, the monitoring of a uniform distribution of the load material. According to DE 195 08 239 A1, the weight of a trailer is supposed to be able to be measured during travel, without taking into consideration the transfer of force between the tractor and the trailer. Furthermore, in operation the most precise possible determination of the weight of the payload is especially desired for the purpose of accounting; it can, however, also serve the forming of conclusions on the wear on the vehicle. With the arrangement according to U.S. Pat. No. 5,877,455 the acceleration behavior of the axles on which the acceleration sensors are arranged is strongly influenced by the spring behavior of the tires. Different air pressures in the tires as well as different deformations of the tires can thus influence the measurement results. The air pressure in the tires is influenced by the temperature of the tires, this again through ambient temperature, sunshine as well as travel duration and travel speed. The deformation of the tires is influenced by the tread pattern strength as well by through the age of the tires.

It is desirable, beyond just the registration of the amount that is being transported by the vehicle, to also give evidence as to whether the vehicle is traveling in an unloaded or a loaded condition. This kind of information is used by the design engineer in the dimensioning of the vehicles and by the owner of the vehicle in the choice of the tires best suited for the load at the time. In addition, the information can allow, for example especially with rental vehicles, evidence about whether an impermissibly long stretch is covered with an impermissible load or whether in general a prescribed maximum loading has been exceeded, for example, depending on the unevenness of the ground, whether a specific maximum weight was contained. Furthermore, through a supplementary weight determination, a distinction can be made between the pausing and loading time, so that operational events can be optimized.

With the known arrangements there is a disadvantage in that the evidence about the present weight can be obtained usually only in a certain weighing position of the component assuming the payload, for example in a certain tipping position of the selected dumping body. This holds true, for example, for conventional weighing rods which are provided with strain gauges and which evaluate a torsion or a bending of the weighing rods. However, in the rest condition of the component assuming the payload, if this component is not tipped no evidence can be gathered on the load weight of the vehicle. Depending on the tilt state of the vehicle during the weighing, the weight determination can be erroneous, so that false weight data can inadvertently or, in the case of rental vehicles, intentionally result.

Other measuring methods are independent of a particular weighing position of the component assuming the payload. Such systems, which for example evaluate the hydraulic pressure on the piston with which the component is raised, yield usable measurement results, however, only when the component under consideration at the time is raised. In the rest condition of this component, if the hydraulic piston is not activated no evidence concerning the load weight of the vehicle can be obtained.

Furthermore, measurement methods are known in which the pressure in oil- or gas-filled springs and shock absorbing elements of the vehicle can be determined. These methods are independent of a particular weighing position and can also work in the rest condition of the component assuming the payload. The disadvantage, however, is their complicated construction and the required special adapting to the multiplicity of different vehicle types. The measurement accuracy can be interfered with by the raised friction inside the spring elements, if the spring elements are provided in a slanted position with respect to the vertical or the vehicle is positioned on steep ground. Also, different frictional values result inside such (MacPherson) struts due to temperature influences, so that in the course of the day, with changing ambient temperatures or depending on the sunshine, different measurement values are obtained for the same payload and the weight indications are correspondingly inaccurate.

The object of the invention is, proceeding from a generic arrangement, to improve the arrangement so that it makes possible the obtaining of evidence concerning the load condition of the vehicle with the vehicle standing still, the arrangement being applicable in a cost-effective way to a multiplicity of different vehicles, as well as to specify a suitable process for this.

FIG. 1 is a schematic illustration of one embodiment of an arrangement for recording a weight of a payload of a vehicle made in accordance with the present invention.

In other words, surprisingly the invention does not propose to apply a most accurate possible measurement system but rather proposes to use a known, rather crudely working measurement system which up to now made possible no precise quantitative information on the level of the weight of the payload under consideration, but which made possible a basic, qualitative determination about whether the vehicle at the time was loaded, so that subsequently a statement is possible about whether it is in the loaded or unloaded condition.

If, for example, an empty trip is made, then with a later evaluation by a trip recorder or of a similar recording a subsequent standing still of the vehicle is not necessarily interpreted as loading time. Rather a trip interruption could be required on technical grounds or the driver could be taking a break.

A loading of a vehicle is nevertheless recognizable through considerable vertical accelerations at least of the dump body or of a similar component receiving the load, usually also possibly through a minimally-damped corresponding vertical acceleration of the whole vehicle or of the vehicle chassis.

In contrast to the arrangements of U.S. Pat. No. 5,877,455, as illustrated in FIG. 1 the influences of the tires on the spring system and thus on the acceleration behavior of the sensor 210 are considerably less, because the sensor(s) is/are arranged not on an unsprung axle but rather on a sprung part of the vehicle 100, for example on the vehicle chassis 110, so that the suspension system action of the whole vehicle has an effect on the sensors, the spring behavior of the tires themselves acting on the sensors in only a minor way. The mounting of the sensors on the sprung parts of the vehicle can be done in a simple manner so that the sensors and their cables are optimally protected against mechanical damage.

The arrangement according to the invention makes possible a statement concerning the effectiveness of the loading process since, for example, every dumping of the shovel contents of a front end loader into the dump body of a dump truck effects a loading or acceleration peak. If for two loading events the same amount of payload is intended with a different number of shovel unloadings, the loading event with more shovel unloadings is disadvantageous due to the more numerous dumping events and longer travel distance of the front-end loader, even if both loading events take the same time.

The condition recognized through the vertical acceleration "stressing" of the vehicle is denoted in a data storage unit 200, which contains an identification corresponding to the point in time of the stressing, e.g., mechanically in the form of a cursor on the speedometer disc of a speed recorder or in the form of information in an electronic data storage unit. Instead of a local data storage unit in the vehicle, provision can also be made for the data storage unit to be centrally arranged, for example at an industrial site to which the vehicle is subsequently moved, and the data can be transferred by radio to the central data storage unit.

The degree of the stressing of the vehicle at the loading itself can be measured directly through the vertical acceleration. This stressing or vertical acceleration at the loading is, in any case, not a reliable measure of the weight of the payload because it is dependent, for example, on the height of the fill of the loaded material, as well as on the form of the unevenness of the ground while the vehicle is traveling.

Independent of this stressing at the loading itself, an analysis of the stressing of the vehicle can retroactively take place at latest when the load weight has been precisely determined, e.g., while the material was unloaded. This can take place by means of weighing equipment, known of itself, present on the vehicle, e.g., by means of pressure sensors in the hydraulic dumping cylinders of a dumping body, or by means of an external scale, e.g., at a bunker that is filled by the vehicle.

If necessary, the sensors for determining the vertical acceleration can also register an unloading process, especially, e.g., if large stones tumble out of the dumping body. Between these two points in time, of the loading on the one hand and the later unloading, which, if applicable, can be related to the exact determination of the weight of the payload, all the driving conditions of the vehicle with respect to the stressing can be subsequently ascertained and evaluated. For this purpose the ascertained measurement values, and among others also those of the vertical acceleration sensors, are entered into a data storage unit and are not—or are not only—visible to the driver at the time.

The vertical acceleration can, in addition, yield information on the vehicle stressing during travel over uneven ground, if the values of the sensors registering the vertical acceleration not only are passed on to the data storage unit as an evaluated or filtered signal with the meaning content "loading process in progress", but rather if also the signals of such a driving operation are passed on to the data storage unit. The additional knowledge as to whether the vehicle was here loaded or unloaded can make possible the exact calculation of the forces acting on the vehicle and its individual components.

The arrangement according to the invention can be applied in a simple and very cost-effective way to the vehicle or can be fitted subsequently, possibly by supplementing any kind of weighing system already installed.

The sensors need not be vehicle-specific, but rather can be produced cost-effectively in large quantities for application to any vehicle whatsoever.

The sensors can be arranged so as to be protected, e.g., in the region of the vehicle chassis, and it is also possible to arrange the cables so they are protected.

Particularly cost-effective is the possibility of the arrangement of fewer sensors, in particular a single sensor, which suffices for the desired purely-qualitative data on the load condition. The material and installation costs can thus be kept especially low.

Concerning the sensors, which could be arranged in the region of the dumping body or of a similar component that accepts the payload, in order to register a loading process, thus a considerably simpler installation is possible with correspondingly lower installation costs as well as a less damaging and more reliable operation.

The sensor(s) can be mounted advantageously under the anticipated center of gravity of the payload, e.g., under the middle of a dumping body, on the component accepting the payload or on the vehicle chassis.

Here the mounting of the sensors is quite easy, because they simply have to be screwed to the vehicle component. In this case it is not necessary to open the present components of the vehicle, possibly oil- or gas-filled components such as the mentioned (MacPherson) struts.

Advantageously, provision can be made for a system of time recording whereby certain hourly, operational or travel time values of the sensors can be attributed to the vertical acceleration. In this way a simple evaluation is later possible, since it can be exactly established at which point in time the vehicle was loaded and, if applicable, was unloaded, so that a simple comparison with the data, on hand in any case, of the precise weight determination is possible and thus it is possible to state when the vehicle was exposed to which stresses.

Furthermore, provision can advantageously be made for a system for recording stretches of the road, which system records the stretches of the road covered by the vehicle. The mentioned system for recording time then makes possible the simple attribution of particular stretches of the road to particular times, so that at a glance it is clearly ascertainable over which distances and over which periods of time the vehicle was moved loaded or unloaded.

In particular, the linking of the known load conditions to other values such as stopped time, travel time, average speed etc. can be used for -determining the optimal operating conditions, e.g., maintenance intervals or tire choice.

Advantageously, the arrangement according to the invention is supplemented by the usual weight sensors 220 provided on the utility vehicle, so that in the described way not only can evidence be obtained concerning the driving conditions but also subsequently, due to the weight recording, precise evidence as to the weight stresses under which the vehicle was operated.

After the exact determination of the weight of the payload it is possible to compare the weight of the payload with particular acceleration values of the vertical acceleration sensors, such as, e.g., that arise during loading of a stationary vehicle. In spite of the inaccuracies thus arising, a rough estimate of the load weight can be assumed from this at the next loading event on the basis of the measured acceleration values, so that, e.g., the driver can obtain a first rough estimate of the payload loaded into the vehicle. Further such comparisons of acceleration values and later—ascertained exact loads can lead to a calculation of a sufficiently accurate average value, which is utilized for the correlation "acceleration value, on the one hand-payload, on the other hand" and then can be referred to for a rough estimate of the weight of the payload.

Most of the loading events run discontinuously, e.g., by means of a front-end loader, which fills several-scoop loads into the vehicle at time-spaced intervals. In this, due to the changing total weight of the vehicle from scoop load to scoop load, even with identical scoop content weights and identical dumping heights, the, e.g., fourth or fifth scoop causes lower acceleration values than the first scoop, since the mass content ratio between the vehicle and the: newly loaded load changes with each scoop. For the previously mentioned rough estimate of the load weight, that is, if beyond the purely qualitative "loaded—unloaded" evidence a rough estimate is supposed to be made concerning the weight of the load based on the value of the acceleration sensors, provision can thus be made that the stress peaks that are ascertained with the accelerations sensors be weighted differently over time within a loading process, e.g., the first peak is weighted at 100%, the second peak at 120%, and so forth.

What is claimed is:

1. Arrangement for recording a weight of a payload of a utility vehicle, comprising:

a first sensor for recording vertical acceleration caused by stress to the vehicle generated by the payload, wherein the first sensor is arranged on a sprung component of the vehicle; for determining whether or not the payload is present on the vehicle;

a second sensor for measuring the weight of the payload; and a data storage unit for registering information ascertained by the first sensor and the second sensor.

2. Arrangement according to claim 1, further comprising a system for recording time, whereby certain times are attributed certain measurement values of the sensor.

3. Arrangement according to claim 2, further comprising a system for recording stretches of road covered by the vehicle, whereby certain stretches of road are attributed to certain times.

4. Arrangement according to claim 1, wherein provision is made for two or more sensors for recording the vertical acceleration.

5. Arrangement according to claim 1, wherein the first sensor is attached to a chassis of the vehicle.

6. Method for registering a payload of a utility vehicle, wherein signals of sensors for ascertaining vertical acceleration register a weight stressing of the vehicle or of a component assuming the payload, the method comprising:

measuring whether or not the payload is present on the vehicle; and feeding the signals of the sensors to a data storage unit directly or in processed form.

7. Method according to claim 6, wherein, at a later point in time, an exact weight determination of the payload is made.

8. Method according to claim 6, wherein information on time of day, operating time or travel time and on stretches of road covered by the vehicle are attributed to the signals of the sensors recording the vertical acceleration.

* * * * *